Dec. 13, 1927.
W. L. CHILDS
1,652,348
ROLLER CUTTER MOUNTING
Filed April 2, 1927
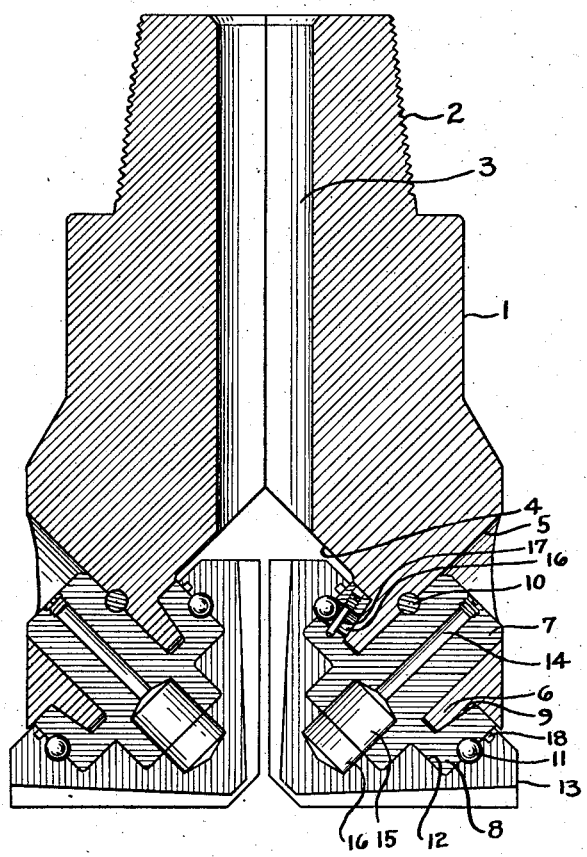
INVENTOR
William L. Childs
BY Vincent Martin
ATTORNEY.

Patented Dec. 13, 1927.

1,652,348

UNITED STATES PATENT OFFICE.

WILLIAM L. CHILDS, OF HOUSTON, TEXAS, ASSIGNOR TO REED ROLLER BIT COMPANY, OF HOUSTON, TEXAS, A CORPORATION OF TEXAS.

ROLLER-CUTTER MOUNTING.

Application filed April 2, 1927. Serial No. 180,579.

This invention relates to deep well drilling apparatus, and more particularly to rotary boring drills.

The object of the invention is to provide a new and improved means for mounting roller cutters in bit heads.

The drawing is a sectional elevation, illustrative of the preferred embodiment of the invention.

Referring specifically to the drawings, a two-piece bit head is indicated at 1, having a screw-threaded shank, as shown at 2, adapted for attachment to a pipe, whereby the two parts of the head are locked together, a central water course 3, and a substantially V-shaped recess 4 in the lower end thereof. The central water course 3, it will be understood, is formed by opposite grooves in the meeting faces of the two pieces; and the recess 4 by the upwardly and inwardly inclined bottom faces of said pieces.

An inwardly and downwardly extending bore 5 is cut in both pieces of the head. The pieces are also provided, adjacent said bore, with a beveled annular flange 6, projecting from the bottom faces thereof.

Bore 5 is adapted to receive a spindle 7. Spindle 7 has an enlarged portion 8. An annular beveled groove 9 is cut in said portion, into which flange 6 enters. A pin 10, as shown, is driven in a small bore in the head intersecting bore 5, said pin resting in a transverse groove in spindle 7 to lock said spindle in the head.

Enlarged portion 8 has a raceway in the periphery thereof, as shown, and ball bearings 11 are placed between this raceway and the corresponding raceway formed in the wall of recess 12 of roller cutter 13, whereby the cutter is rotatably locked on spindle 7.

A grease duct 14 in spindle 7, leads to a recess 15. Recess 16 is formed in cutter 13 so that it will be opposite recess 15. These two recesses form a grease chamber. The outer end of duct 14 may be closed by a removable screw-threaded plug, as shown.

Enlarged portion 8 has a hole 16 of a diameter greater than that of balls 11, and through which said balls are to be passed. A pin 17, screw-threaded in another hole at approximately right angles to hole 16, as shown, extends across hole 16, and prevents the untimely passage of balls 11 therethrough.

A small groove may be formed in recess 12 to receive packing 18, whereby the cutter may be sealed to the spindle and the escape of lubricant from between the two and the entry of foreign matter therebetween prevented.

The assembly of the parts, and the advantages thereof, may briefly be outlined as follows:

Pin 17 having been removed, the spindle is placed in the cutter and balls 11 are passed through hole 16 into the raceways. Pin 17 is then replaced to prevent the escape of the balls from the raceways. The plug is removed from duct 14, and grease is forced through the duct into the grease chamber 15, 16, and the plug then replaced. The cutters are thus rotatably locked on the spindles prior to the mounting of the spindles in the head. The cutters and spindles may therefore be assembled and properly greased before being sent to the place where they are to be used, and the danger of foreign matter entering between the same thereby eliminated.

Spindle 7 is then inserted in the bore 5, and rotated so that hole 16 will be at its point nearest the center of the head. Locking pin 10 is then driven in. It is well known that the greatest lateral pressure upon the cutter will be exerted inwardly, and that the outer side of the spindle will sustain such lateral thrust. Pin 17 is therefore placed on the inner side of the spindle where it will not be subjected to said pressure. Spindle 7 being locked non-rotatably in the head by pin 10, pin 17 will be held in its innermost position.

The beveled groove 9 enables beveled flange 6 to snugly engage spindle 7 and strongly support the same.

After each of the cutters is thus mounted in its respective part of the head, the meeting faces of the parts are brought together and locked in the usual manner by the threading of shank 2 in a pipe not shown.

Few parts constitute the complete device, and these can be quickly and easily assembled and taken apart and the device is so designed that it will stand up under the most trying conditions.

I claim:

1. In a rotary boring drill, a head having a bore and an annular flange adjacent said bore, a spindle locked in said bore and having an enlarged portion, said enlarged portion having a groove therein into which said flange extends, and a roller cutter mounted on said spindle.

2. In a rotary boring drill, a head, a spindle removably mounted therein, said spindle having a raceway, a cutter on said spindle and having a raceway, and removable balls in said raceways, said cutter being thereby rotatably locked on said spindle independently of said head.

3. In a rotary boring drill, a head, a spindle removably mounted in said head, said spindle having a raceway and a hole leading therefrom, a cutter on said spindle and having a raceway, and balls in said raceways removable through said hole, said cutter being thereby rotatably locked on said spindle independently of said head.

4. In a rotary boring drill, a head, a spindle having a raceway and a hole leading therefrom, a cutter on said spindle and having a raceway, balls in said raceways, said cutter being thereby rotatably locked on said spindle independently of said head and said spindle being so locked in said head that that part thereof having said hole will be near the center of said head.

5. In a rotary boring drill, a head having a bore and an annular flange adjacent said bore, a removable spindle fitting in said bore and having an enlarged portion, said enlarged portion having an annular groove into which said annular flange extends, a raceway, and a bore connecting said groove and said raceway, a cutter having a raceway, and balls in said raceways removable through said bore in said spindle.

6. In a rotary boring drill, a head having a bore and an annular beveled flange adjacent said bore, a removable spindle fitting in said bore and having an enlarged portion, said enlarged portion having an annular, beveled groove in which said flange snugly fits, and a cutter mounted on said spindle.

7. In a rotary boring drill, a head, a spindle having a raceway and a bore leading therefrom, a cutter mounted on said spindle and having a raceway, balls in said raceways removable through said bore, said spindle having another bore intersecting said first-mentioned bore, and a pin in said last-mentioned bore and removably extending across said first-mentioned bore to prevent the escape of the balls from the raceways.

8. In a rotary boring drill, a head having a bore and an annular flange adjacent said bore, a spindle locked in said bore and having an enlarged portion, said enlarged portion having a groove therein into which said flange extends, and a roller cutter mounted on said spindle and enclosing the end thereof.

9. In a rotary boring drill, a head having a bore and an annular beveled flange adjacent said bore, a removable spindle fitting in said bore and having an enlarged portion, said enlarged portion having an annular, beveled groove in which said flange snugly fits, and a cutter mounted on said spindle and enclosing the end thereof.

10. In a rotary boring drill, a head, a spindle having a raceway and a transverse bore leading therefrom, a cutter mounted on said spindle and having a raceway, and balls in said raceways removable through said transverse bore.

11. In a rotary boring drill, a head, a spindle having a raceway and a transverse bore leading therefrom, a cutter mounted on said spindle, and having a raceway, balls in said raceways removable through said transverse bore, and removable means to prevent the escape of the balls from said raceways.

In testimony whereof, I hereunto affix my signature.

WILLIAM L. CHILDS.